(No Model.)
G. LINDSAY.
BELT TIGHTENER.
No. 507,625. Patented Oct. 31, 1893.
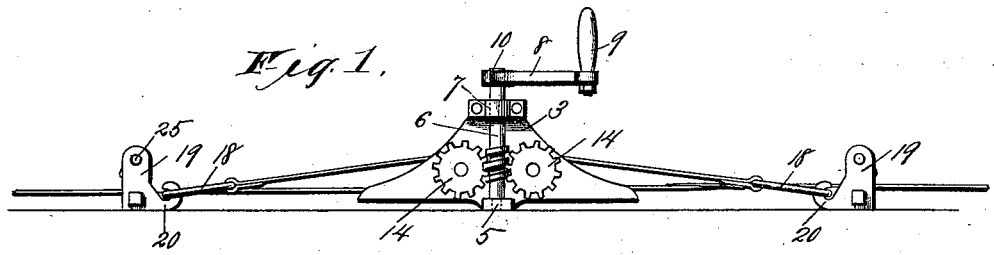
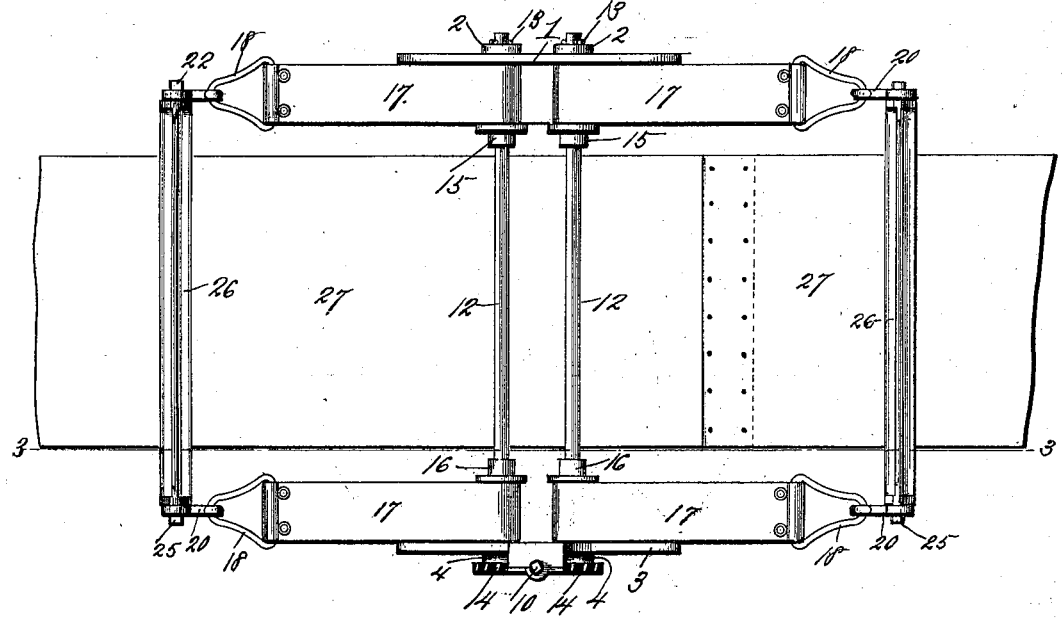
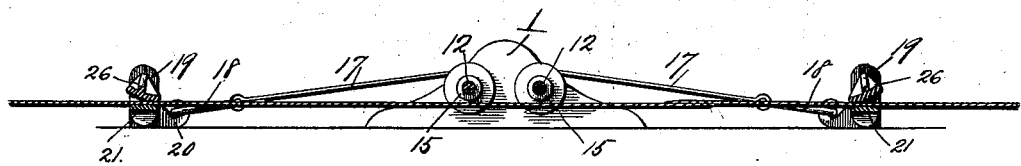
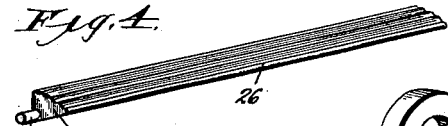
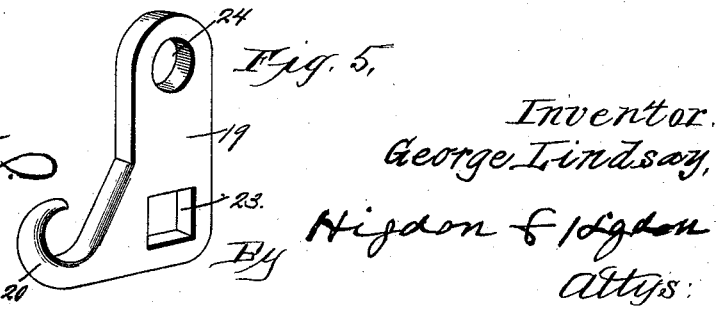
Witnesses:
Inventor.
George Lindsay,
By Higdon & Higdon
Attys.

UNITED STATES PATENT OFFICE.

GEORGE LINDSAY, OF KANSAS CITY, KANSAS.

BELT-TIGHTENER.

SPECIFICATION forming part of Letters Patent No. 507,625, dated October 31, 1893.

Application filed May 1, 1893. Serial No. 472,574. (No model.)

*To all whom it may concern:*

Be it known that I, GEORGE LINDSAY, of Kansas City, Wyandotte county, Kansas, have invented certain new and useful Improvements in Belt-Tighteners, of which the following is a full, clear, and exact description, reference being had to the accompanying drawings, forming a part hereof.

My invention relates to appliances for taking up the slack of belts which are employed for transmitting motion in machinery of all classes and types, and the objects of my invention are to produce a belt tightener which shall be simple, strong, durable and inexpensive in construction and very easy to operate, and which shall be capable of tightening belts or bands of all descriptions.

A further object of my invention is to produce a belt tightener which in addition to the advantages above enumerated shall be capable of tightening the belts without necessitating any removal of the belts, pulleys or other similar parts of the machinery to which they are applied. Furthermore, to produce a belt tightener, the operative mechanism of which can be stopped at any desired time without any possibility of retrograde movement of its parts or of any slipping of the belt over the tightener.

To the above purposes my invention consists in certain peculiar and novel features of construction and arrangement as hereinafter described and claimed In order that my invention may be fully understood, I will proceed to describe it with reference to the accompanying drawings, in which—

Figure 1 is a side elevation of a belt tightener embodying my invention and in operative connection with a belt or band. Fig. 2 is a plan view of the same. Fig. 3 is a vertical longitudinal section of the same on the line 3—3 of Fig. 2. Figs. 4 and 5 are detached perspective views of certain details of construction.

In the said drawings, 1 designates one of the bearing plates of the belt-tightener; this bearing plate being of approximately triangular form and extending longitudinally of, and at one side of the belt tightener. In this bearing-plate 1, at points equally opposite from its vertical middle, are formed two outwardly extending hollow integral bosses 2 which constitute the bearings for the two winding-shafts of the belt-tightener to be hereinafter fully described.

3 designates the companion bearing plate of the tightener; this bearing-plate being also of approximately triangular form and extending longitudinally of the tightener at the opposite side of the same from that occupied by the bearing-plate 1 just described. Upon this companion-bearing plate 3 at points equally opposite from its vertical middle, are formed two outwardly extending hollow integral bosses 4 which constitute the bearings for the opposite ends of the winding-shafts before mentioned. Midway the length of the margin of this companion plate 3 is formed an outwardly extending lug 5 which constitutes a step-bearing for a vertical shaft 6. This shaft 6 extends at its upper end portion through a bearing 7 which is bolted or otherwise similarly secured to the outer side of the bearing plate 3 at the apex thereof. At the upper end of this shaft 6 is detachably connected a crank-arm 8 which carries at its outer end a suitable crank-handle 9; the upper end 10 of the worm-shaft being formed square or angular to receive the inner end of the crank-handle 9. At a point intermediate of the bearings 5 and 7, the shaft 6 is formed with a worm-thread 11 for a purpose to be presently explained.

12 designates the two winding shafts of the tightener; these winding-shafts being of any suitable length; it being my intention to form such shafts of a length considerably greater than the width of belts such as are usually provided for various types of machinery. These two shafts extend parallel with each other and transversely of the belt-tightener and one end of each shaft extends through the bearing bosses 2 of the bearing-plate 1; suitable cross-pins or keys being passed transversely through the protruding ends of the shafts and abutting against the outer ends of the bearing bosses 2 as shown. The opposite ends of the shafts 12 extend through the bearing bosses 4 and the bearing plate 3 and carrying at their protruding ends each a worm-wheel 14. It will thus be seen that these two worm-wheels 14 are located at opposite sides of the worm-shaft 6 and that their teeth engage with opposite sides of the worm thread 11 of such shaft. At points within the bearing-plate 1 and adjacent to the inner surfaces of said bearing plate, the shafts 12 carry each an external shoulder or collar 15, while at points within the bearing-plate 3 and at a suitable distance from the inner side of the latter, the shafts 12 carry each a similar collar 16.

17 designates four straps which are either of leather, or canvas or other similarly flexible and strong material, and the inner ends of which are riveted or otherwise secured to the shafts 12 at points between the collars 15 or 16, and the bearing plates 1 or 3; it being understood that one pair of these straps or flexible connections is located adjacent to the bearing plate 1 while the other pair of said flexible connections is located adjacent to the companion bearing plate 3. The arrangement is such that the bands 17 can be wound upon or unwound from the end portions of the winding shafts 12, as will be hereinafter fully explained. At their opposite or outer ends the bands 17 carry eyes or loops 18, there being one of such loops for each band 17.

19 designates four end plates, each of which is of vertical elongated form and the inner side of each of which is formed at its lower end with an inwardly extending hook-shaped projection 20 which enters one of the loops or eyes 18 just referred to. These four end plates 19 are arranged in two pairs; one pair being located at one side of the two winding-shafts 12; the other pair at the opposite side of said winding-shafts. Through the lower parts of each pair of these end plates extends the outer end portion of a flat clamp bar 21, the lower parts of the end plates 19 being each formed with angular openings 23 to receive a corresponding angular end portion 22 of the clamping bar. It is to be understood that the end portions 22 of the clamping bars 21 enter removably into these openings 23 of the end plates 19; the arrangement being such that one or another of the end plates can be removed from the clamping bars at pleasure for the purpose to be hereinafter explained. The upper end of each end plate 19 is formed with an opening 24 having a circular margin and into these openings extend trunnions 25 which extend longitudinally from opposite ends of a gravity clamp 26; the trunnions 25 being formed upon upward extensions 27 at the ends of the clamps 26. These clamps 26 are of elongated form so as to extend each from one end plate to the other end plate of each pair, and transversely said clamping plates are of segmental form as shown. The under side of each clamping plate is corrugated or serrated; such serrations or corrugations either being in the form of longitudinal parallel ribs, as shown, or otherwise, as preferred and the longitudinal medial line of each bar lies normally at one side of the center described by the trunnions 25. The arrangement is such that the clamping plates can swing inward freely toward the winding shafts 12 but upon moving outward from said winding shafts said clamps will impinge upon the upper sides of the clamp bars 21.

The operation of the above described belt tightener is as follows: Let 27 designate a belt such as is commonly used for transmitting power from a belt pulley upon a line shafting to a belt pulley upon a machine, or between belt pulleys upon the same machine, or in any of the other various situations in which power is transmitted by belts. After these belts have been in use for a short time, the longitudinal strains to which they are subjected stretches them, thus increasing their length perceptibly and causing slack and other inconveniences of action in the belts. One end plate 19 of each pair of brackets (those at the same side of the belt tightener) is removed and the belt tightener is moved laterally so that its clamps 26 and clamp bars 21 shall embrace the two end portions of the belt, or in other words, at opposite points from the lacing of the belts. The two end plates 19 which were previously removed are now replaced and rotary motion in the proper direction is imparted to the worm-shaft 6 by means of a crank-handle 9 so as to wind the straps 17 upon the winding shafts 12; thus drawing the two end portions of the belt toward each other and beyond each other if required, by the particular type of belt lacing employed. During this action the clamps 26 are caused to swing outward away from the winding shafts 12 and firmly grip or clamp the end portions of the belt so as to prevent all possibility of any slipping of the belt over the tightener. It is to be observed that if the revolution of the winding shaft 6 be stopped at any time, the tightener instantly and automatically locks itself against retrograde movement of its operative parts, and I wish it to be understood that I regard this as a highly important and advantageous feature of my invention. When the belt has been strained or tightened to the required degree the rotation of the winding shaft 6 is stopped and the lacings or fastenings of any suitable type are used for connecting the ends of the belts together. Two of the end plates at the same side of the tightener are now again removed and the tightener itself is drawn laterally away from the belt; the belt being highly strained or tightened properly for effective or proper use.

From the above description it will be seen that I have produced a belt tightener which is simple, strong, durable and inexpensive in construction, which comprises but few operative parts which is capable of tightening all kinds of belts or bands without necessitating any removal of the same from their belt pulleys, and which automatically locks itself upon cessation of movement of its connecting shaft at any time.

Having thus described my invention, what I claim as new therein, and desire to secure by Letters Patent, is—

1. A belt tightener, comprising a pair of bearing-plates, a pair of parallel shafts connecting said plates and journaled therein, a pair of flexible connections secured at their inner ends to each shaft, and loops carried at their outer ends, in combination with a pair of clamp-bars, and end-plates removably mounted upon each end of said bars and provided with hook extensions engaged by the said loops, and a gravity clamp-bar pivotally carried by said end-plates and adapted to clamp a belt upon the clamp-bar carrying the end-castings, and means to operate said parallel shafts, substantially as set forth.

2. A belt tightener, comprising a pair of castings, a revoluble worm-shaft carried thereby, a pair of parallel winding shafts revolubly journaled in said castings, and worm-wheels carried by said shafts and meshing with the worm-shaft, in combination with a pair of clamp-bars, and pivotal gravity clamp-bars carried thereby, and adapted to clamp a belt therebetween, and flexible bands connecting the first-mentioned clamp-bars with the winding shafts, and means to actuate the worm-shaft so that the flexible bands shall be wound upon the winding-shafts, substantially as set forth.

3. In a belt-tightener, the combination with a pair of parallel and oppositely disposed bearing-plates, a pair of parallel winding shafts, and collars mounted thereon inward of said bearing-plates, and a pair of clamp-bars, having squared ends, end-plates having each a squared opening detachably fitted upon the squared ends of the clamp-bars, and having circular apertures, and having inwardly extending hooks, and gravity clamping plates having cylindrical ends engaging said circular apertures, and loops detachably engaging said hooks, and flexible bands secured to the winding-shafts between the bearing-plates and the collars, and carrying the loops, substantially as set forth.

In testimony whereof I affix my signature in the presence of two witnesses.

GEORGE LINDSAY.

Witnesses:
MAUD FITZPATRICK,
M. P. SMITH.